Oct. 6, 1964                V. F. ZAHODIAKIN                3,151,653
QUICK-LOCKING FASTENING DEVICE
Filed June 17, 1959                                3 Sheets-Sheet 1
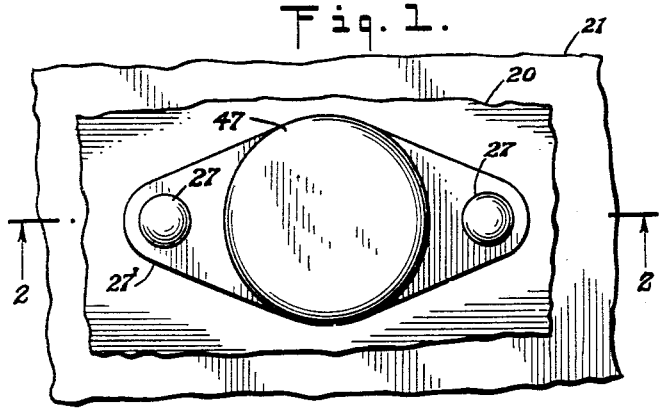
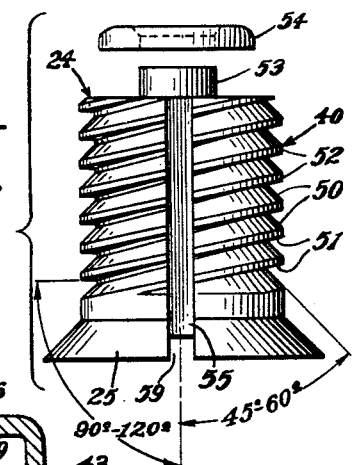
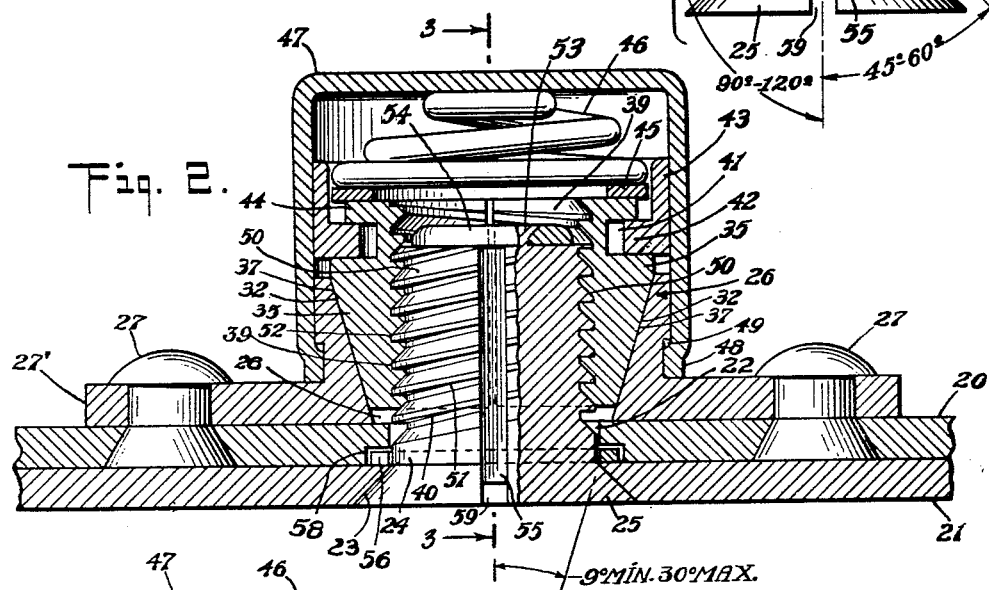
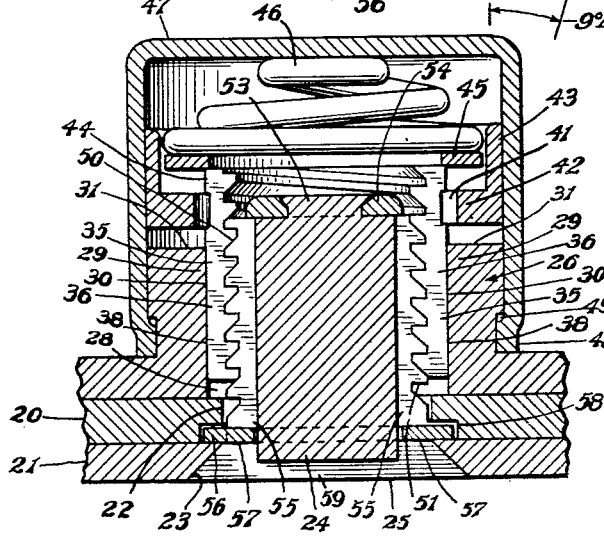
INVENTOR.
Victor F. Zahodiakin
BY
Howard P. King
ATTORNEY

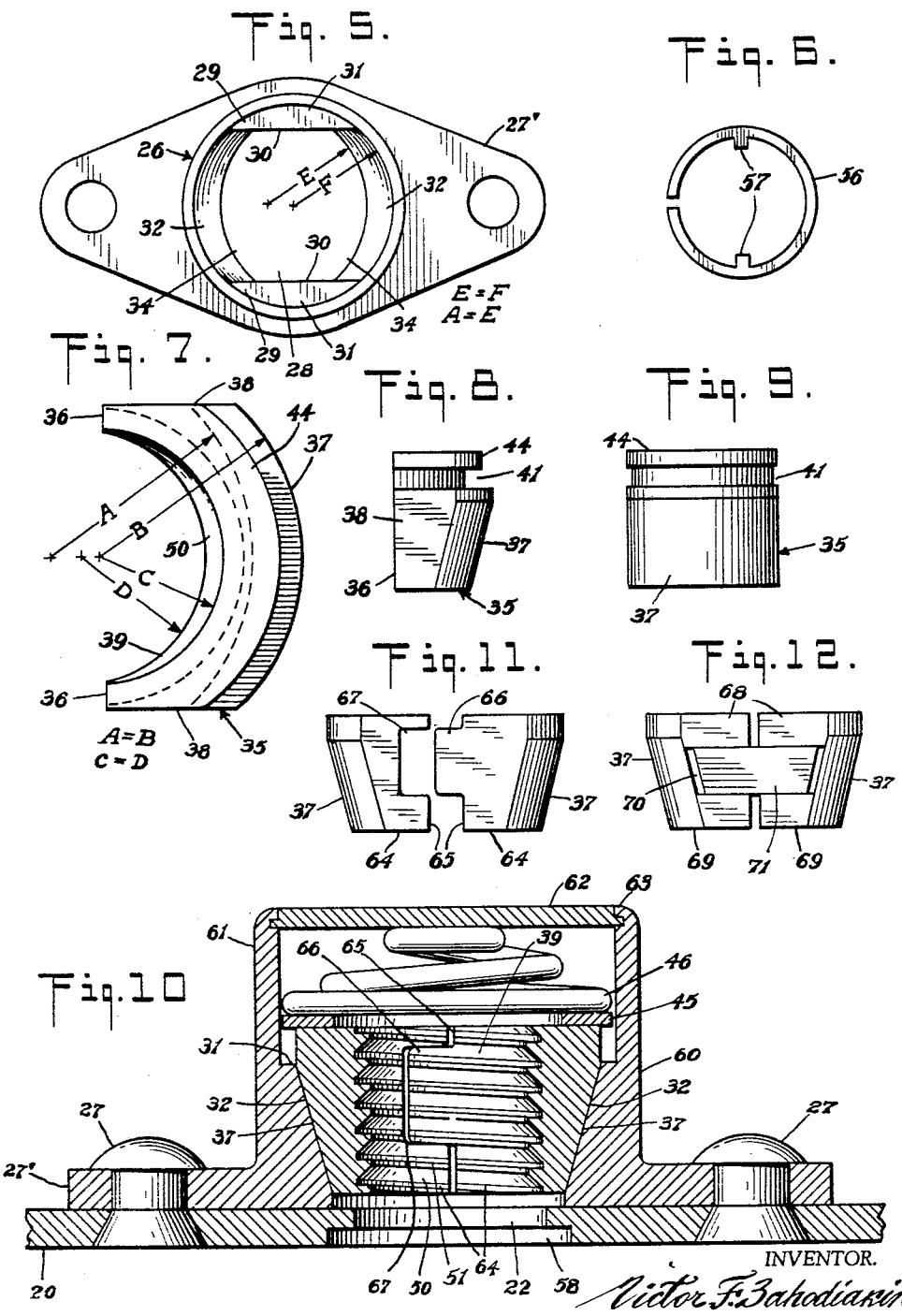

Oct. 6, 1964     V. F. ZAHODIAKIN     3,151,653
QUICK-LOCKING FASTENING DEVICE
Filed June 17, 1959     3 Sheets-Sheet 3
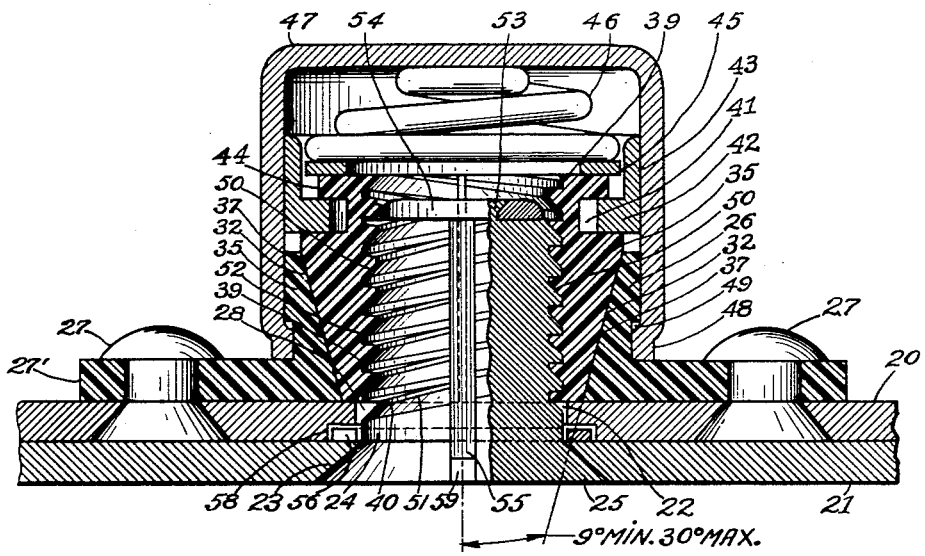
INVENTOR.
Victor F. Zahodiakin
BY Howard P. King
ATTORNEY.

United States Patent Office 3,151,653
Patented Oct. 6, 1964

3,151,653
QUICK-LOCKING FASTENING DEVICE
Victor F. Zahodiakin, P.O. Box 689, Summit, N.J.
Filed June 17, 1959, Ser. No. 821,026
8 Claims. (Cl. 151—19)

This invention relates to fastening devices such as adapted for use in fastening together superposed panels or other members or assemblies, and is a continuation in part of application S.N. 739,112 filed June 2, 1958, now abandoned. Quickly operable devices of this general character have extensive uses in industry, as for use with aircraft as well as a variety of other applications, for securing in place various members, such as plates, brackets, doors and panels, among numerous other parts and things. The invention has particular reference to fastening devices of the so-called rotary type, that is, of a type adapted to be secured in place by pressing on the head of the stud to slide it inwardly, and/or by relative rotation of the stud in its socket.

In its general aspect, the invention contemplates an improved fastening device of quick-locking push-rotary type as above defined, which will lock tightly in place and remain securely in place under all conditions of use.

A more specific object of the invention is to provide a push-rotary type fastening device in which longitudinal displacement between threaded jaws within a receptacle is obtained by means of a threaded bolt or stud engaging within said threaded jaws and generating a great radial force between the jaws and receptacle which is transmitted to the bolt or stud and thereby provides positive locking engagement.

Another object of the invention is to provide a push-rotary type quick locking fastening device with a plurality of threaded jaws which tend to contract toward the axis to generate a constant prevailing torque on the threaded stud and thereby prevent the stud from disengaging from the device regardless of adverse conditions, such as when the stud is not fully screwed home.

It has been found, through extensive tests and research, that jaws with frusto-conical surfaces, become over stressed, break under load, and quickly wear out due to the fact that frusto-conical surfaces of jaws of a split nut, at all positions within the receptacle, cannot provide surface contact with the receptacle, and therefore the radial force generated by the axial load will be so concentrated that it will over stress the jaws and receptacle with the result of breakage and/or damage to the surfaces and in any event uneven and rapid wear. In further explanation of the above, it may be pointed out that there is only one very precise position of a frusto-conical split nut in a frusto-conical receptacle where full surface contact will exist, but if the nut is at a higher or lower location in the receptacle, even very slightly, instantly there is only line contact between the frusto-conical surfaces of the nut segments and the frusto-conical surface of the receptacle, and the entire load is then applied at the line contact instead of on the entire surface. Thus, any microscopic deviation in thickness of the members being clamped will cause the segments to make only a line contact with the receptacle, rather than a desired surface contact. An essential object of the present invention therefore contemplates providing and maintaining a surface contact between tapered surfaces of nut segments and the receptacle.

More specifically, the invention proposes a push-rotary type fastening device which has a tubular receptable the interior cavity or bore of which is provided with diametrically located channels of inclined segmental cylindrical character of a form having equal radii throughout its inclined surface.

Also specifically, another object of the invention is to provide inter-engaging working surfaces of inclined segmental cylindrical character on the exterior of the jaws for always providing full surface contact of the lapping working surfaces of the jaws with the inclined surfaces of the channels in which located without critical limitation as to depth of seating of the nut segments in the receptacle.

In conjunction with the foregoing objects, the invention also includes the provision of jaws of the character indicated which are constantly urged radially inwardly to generate prevailing torque with respect to a stud passing with threaded engagement between such jaws.

Enlarging upon the last-stated object, the invention provides inter-engaging working surfaces of inclined segmental cylindrical type on the exterior of threaded jaws and interior of the receptacle by which a radial gripping force is generated initially by an axially positioned coil spring and later a maximum axial force is generated with surface contact between the inclined surfaces of the jaws and receptacle, by screwing the stud home.

A most important object of the invention is to provide a receptacle and jaws, with inclined cooperating segmental cylindrical surfaces of constant or equal radii throughout to obtain full surface contact where the surfaces overlap each other and thereby to distribute the radial forces throughout the entire contacting cylindrical surfaces for any thickness, within wide limits, of members being clamped, and thereby eliminate detrimental effects between inclined surface devices heretofore relying upon frusto-conical structure.

A further important object of the invention is that the configuration and the construction of the receptacle and threaded jaws are such that the same may be manufactured by use of pressure formation methods such as powdered metal process or by coining operations, or other analogous methods, whereby precision component parts will be produced at extremely low cost.

Another object and advantage of the invention is that the receptacle of the device can be molded from a suitable plastic, such as a polyamide, of which one identified by the trade-mark "Nylon" made from interaction of alipic acid and hexamethylene diamine is an example, and to thereby have the advantage of extremely light weight and sufficient strength for commercial applications at low cost.

Of like character to the foregoing object, is the provision of a structure applicable for use with low stresses and low temperatures, wherein the receptacle and jaws may be made from a high strength polyamide, such as the above-mentioned "Nylon" or from other type of similar plastic, and wherein the stud may be made of aluminum, whereby the entire device will be extremely light in weight and of extremely low cost.

Another object of the invention is to shape the internal minor diameter of the threads of the jaws in such a way that the threaded jaws at their facing edges will not damage the stud, regardless of the hardness of the jaws, when the stud threads are slid across the threads of the jaws in the manner of a ratchet, and wherein sliding of the stud over the threads of the jaws may be readily accomplished in use without any difficulty.

A still further object of the invention is to provide a locking device which, even though subjected to extremely high temperature sufficient to destroy the resiliency of its spring or the spring becomes otherwise impaired to lose its effectiveness, the device will continue to function in normal manner to obtain and maintain its positive locking force by virtue of positive locking of the stud being effected by radial force generated by axial force applied by screw operation of the stud even though torque applied usually by the spring would be absent.

Other objects, advantages and novel features of construction will become apparent to persons skilled in the art to which the invention appertains as the description proceeds, both by direct recitation thereof and by implication from the context.

Referring to the accompanying drawings, in which like numerals of reference indicate similar parts throughout the several views;

FIGURE 1 is a plan of the fastening device of the present invention showing the same in position on members being clamped;

FIGURE 2 is a vertical section on line 2—2 of FIG. 1;

FIGURE 3 is a vertical section on line 3—3 of FIG. 2;

FIGURE 4 is an elevational view of the stud assembly;

FIGURE 5 is a plan of the receptacle alone;

FIGURE 6 is a plan of retaining ring for the stud;

FIGURE 7 is a plan or end view of one of the jaws;

FIGURE 8 is an elevation of said jaw, looking toward the flat side thereof;

FIGURE 9 is an elevation of the jaw looking at its convex side;

FIGURE 10 is a vertical sectional view similar to FIG. 2, and showing a modified construction;

FIGURE 11 is an elevation of the jaws in said modified construction of FIG. 10, looking toward the flat side of the jaws;

FIGURE 12 is a similar elevation of a further modified construction of jaws; and FIGURE 13 is a sectional view corresponding to FIG. 2, and showing the jaws fabricated from a thermo-setting plastic material and the receptacle of a like thermo-setting plastic material.

There have been many attempts to create fastening devices of the above-mentioned rotary type, but such attempts have involved numerous difficulties. For example, some of such devices require use of intricate parts which easily become ineffective in operation or cannot withstand elevated temperatures, besides involving expensive manufacturing processes. Another difficulty with such devices as are generally available heretofore, resides in the fact that they are made to accommodate substantially only one preselected thicknesses of members to be fastened together, and if such thicknesses vary beyond reasonable tolerances, then complementary parts of different size have to be used, as a result of which a large stock of parts of different sizes have to be maintained on hand in the field. Further difficulty inherent with prior art devices of this nature is that they are excessively limited as compared with their size, in their load-carrying ability, both in respect to shear and to tensil loads. Another difficulty in present-day devices of the character indicated, is that they must be invariably reset during engaging operations if tolerances vary even to a microscopic dimension, since in each locking operation the panels have to be brought tightly together, but when the device is open, the panels frequently assume non-parallel relation and necessitate readjustment of the present-day fastener to a greater spread to accommodate it to the deviation of the panels for obtaining initial bite of the fastener to effect the final clamping of the members, which involves great difficulties and loss of time since after readjustment has been made to obtain the initial bite, retightening is required.

Furthermore, such devices as heretofore available allow separation of the parts fastened together due to the fact that the stud thereof cannot be retained in the nut with sufficient radial grip, and slight twist of the panels or parts causes the stud to move and separate the panels and as a result relative vibration of the parts occurs which finally causes damage to the device or breakage due to crystallization of the metal and consequent disengagement of the fastened panels, which would terminate in tragic results if such devices would be used and thus fail on an aircraft.

By utilization of the present invention, the above mentioned and other difficulties are effectively overcome. In general terms, the structure here disclosed comprises in combination with a threaded stud, a hollow receptacle the interior cavity or bore of which is provided with radial channels of inclined segmental cylindrical shape at the faces thereof adjacent to the periphery of the receptacle. The receptacle is secured to one of the panels or other member to be fastened in place. Said receptacle contains jaws in said channels, said jaws being threaded where facing the axis of the receptacle and where facing the periphery of the receptacle have surfaces of inclined segmental cylindrical shape agreeable to and to engage for full overlapping areas the aforementioned segmental cylindrical faces of the channels. A spring presses the jaws in direction of their converging ends, thereby contracting the jaws radially toward the axis to a smaller pitch diameter of threads on the jaws than provided for the corresponding threads of the stud, and consequently upon insertion of the stud the spring functions to generate a prevailing torque effective on the stud.

The interior or cavity of the receptacle is formed with lands that extend longitudinally of the cavity and project radially inwardly toward the axis thereof and not only provide the sides of said channels, but lands on the opposite sides of the axis have their inwardly directed faces parallel to the axis and spaced from each other a distance greater than the major diameter of the stud. The stud threads and the cooperating jaw threads are specially formed to provide greater slope on one facet than the other to enable the jaw threads to function in the nature of ratchets with the stud threads, thereby enabling the stud to be initially introduced into the jaws, the threads of which are of smaller pitch diameter than the stud threads, and then by simply pressing inwardly on the stud head the jaws are moved axially upwardly and radially outwardly on the inclined segmental cylindrical surfaces in opposition to the spring pressure, thus providing space for entry of the stud. The stud may thus be pushed into the receptacle acting as a ratchet-retained slide as it passes inwardly between the jaws until the panels come into close proximity one to another, and then by twisting the stud clockwise on the threads of the jaws, the jaws move slightly downwardly, bringing the panels into close engagement, and further clockwise rotation of the stud will insure positive locking by generating great radial force on the stud. In special instances where the panels are damaged or are in unusually separated condition, it should be noted that the fact that the jaws are contracted by a spring to smaller pitch diameter than the stud, bite of the very end of the stud may be obtained and screwed in for the required distance to close the panels together and clamp them by screwing the stud home.

After the stud threads once engage, no matter how far home they may be pushed or screwed, the constant prevailing torque to prevent unintentional retraction of the stud will be provided by pressure from the coil spring. Pressure of the coil spring is applied to the upper ends of the jaws through the agency of a pressure-distributing washer beneath the spring and engaging the upper ends of said jaws. The lands toward the jaws provide parallel side faces defining the width of the channels as the same width as the jaws, permitting the jaws to slide both longitudinally and radially of the axis, but confining the jaws from moving in a direction circumferentially of the receptacle. In other words, the jaws cannot rotate in the receptacle. The lands constitute inwardly directed projections within the receptacle cavity and are formed as integral parts of the receptacle. Means will be provided in the illustrated constructions to prevent longitudinal displacement of one jaw with respect to the other so the jaws function as a unitary nut. Furthermore, as shown in FIGS. 2 and 3, said means also is constructed and arranged to retain the nut in axial alignment with the receptacle.

Referring now to the specific embodiment of the invention illustrated in said drawings, and giving attention more especially to the showing thereof in FIGURES 1 to 9 inclusive, the reference numerals 20, 21 designate two members, such as panels, adapted to be juxtaposed and clamped together by the fastening device of the present invention. These members are representative of any number and thickness of bodies to be clamped together, and for distinguishing purposes member 20 will be arbitrarily designated as the inner member, and the other will likewise be arbitrarily designated as the outer member 21. Said members have holes 22, 23 therein adapted to register axially, both of said holes being shown to appropriately receive, in the ultimate assembly, a stud 24 more fully described hereinbelow, insertable through both of said holes, the head 25 being shown as tapered and seating in a corresponding taper of hole 23.

The fastening device also includes a receptacle 26 suitably mounted on the inner member 20 to have coaxial relationship to the stud in the ultimate assembly and therefore coaxial with hole 22 in the member 20 on which it is mounted. For the sake of simplicity of illustration, said receptacle is shown herein as fixed on the inner member by means of rivets 27 through a flange 27' conveniently provided as an integral part of the receptacle, at what is here termed the bottom of the receptacle, but other suitable mounting of the receptacle may be employed.

Receptacle 26 is a hollow body, thereby providing an internal cavity 28 from end to end thereof, said cavity, in transverse cross-section, being predominatingly circular but with chordal lands 29 projecting thereinto at opposite sides of the cavity, the inwardly directed faces 30 of said lands being parallel to each other and to the axis of the receptacle. In FIGURES 3 and 5 two such lands 29 are shown, and the distance between the faces 30 thereof is greater than the maximum thread diameter of the stud 24. The top surfaces 31 of the lands are in a common plane perpendicular to the axis.

The inwardly directed face of the cavity between said chordal lands is inclined, and said face on each side of the receptacle axis is a segment 32 of a true cylinder the axis of which has a slope within the range of 9° minimum to 30° maximum to the receptacle axis as indicated in FIGURE 2. Since there are two chordal lands, there are likewise two cylindrical segments 32 therebetween, and utilizing terminology adopted above, said segments converge downwardly or in a direction toward the mounted end of the receptacle. By virtue of the construction described, the cavity 28 may be said to provide channels 34 diametrically opposed in opposite sides of the receptacle, each channel being in effect one half of the cavity, the side walls of the channels being parallel and constituted by portions of said inward chordal faces 30 of lands 29 and the outer or back walls of the channels being constituted by the said inclined cylindrical segments 32.

Located at least in part in each of said channels 34 is a movable jaw 35 having a width commensurate with the width of the channel between land faces 30 so as to be capable of sliding up and down and in and out with respect to the axis, but with adequate fit within said channel so as not to be free to move in a rotary direction around the axis. The two jaws 35 have longitudinal inward or front faces the edge margins 36 of which for one jaw are directed toward and are parallel to those of the other jaw and adapted to abut thereagainst for limiting inward movement of the jaws toward a common axis. Between said marginal edges 36 said inward or front faces of the jaws are screw threaded, the character of the threads being more fully explained hereinafter, and thus the jaws in assembled relation to each other may be referred to as a unitary nut, but said nut having a longitudinal division on an axial plane.

The back face 37 of each jaw or face remote from said plane and directed radially outwardly, is formed as a segment of a true cylinder the axis of which has an angle to the longitudinal axis of the nut. The radius of that cylindrical segment and the inclination of the axis thereof is made to correspond to the adopted radius and inclination of the above-described inclined cylindrical segments of the receptacle within the range of 9° minimum to 30° maximum. The radii at the bottom and top respectively of the cylindrical segment of the jaw are indicated as A and B in FIG. 7, and for the cylindrical segment back wall of the receptacle channel in FIG. 5 are respectively E and F, and all of these radii are equal to each other. In consequence of this construction, there will always be full surface contact of the lapping contiguous portions of the inclined segmental cylindrical surfaces of the jaws with the respective inclined segmental cylindrical surfaces of the receptacle channels. It now will be recognized that since the inclined cylindrical surfaces provide extensive surface contact at all positions of the jaws, the radial forces, which in use of the device are extremely great, are distributed uniformly over a large surface area contact between the jaws and receptacle.

It also will be evident from the above description of the cooperating inclined segmental cylindrical faces of jaws and receptacle, that contact sliding of a jaw against the inclined segmental cylindrical face of the receptacle will cause the jaw to also have a component of movement in a direction radial to the nut axis but at the same time the axes of the segmental cylindrical faces remain coaxial to each other. By keeping the outward or back face 37 of the jaw always in full contact where overlapping the inclined back wall 32 of its channel, a longitudinal movement of the jaw will of necessity produce a corresponding transverse movement thereof and vice versa, and still always maintain an extensive surface contact. For example, if the jaw is forced upwardly it has to always move outwardly, or if forced outwardly it has to move upwardly also.

In continued description of the jaws, it may be pointed out that each jaw has two flat parallel exterior side faces 38, herein referred to as flats, at proper distance apart so as to fit between and slidably engage the chordal faces 30 of the lands 29 in the assembled device. Said flats 38 are perpendicular to the dividing plane of the nut, or in other words, perpendicular to the above-described edge margins 36 of the jaws. The inwardly directed face of each jaw 35 between its edge margins 36 is of generally segmentally cylindrical concave character about the aforesaid longitudinal axis of the nut, and is provided with screw-threads 39 the full length thereof to be engaged by cooperating screw-threads on the stud 24.

In order that the screw-threads 39 of one jaw will appropriately register with the screw-threads 39 of the other jaw, means are provided to precisely coordinate sliding movement of both jaws. For this, and other purposes, next to the upper ends of said jaws, considered assembled to constitute a nut unit, the jaws at their upper larger portions are made in the form of an external longitudinal cylinder about the axis of the concave innerfaces thereof, and while the line of intersection between such longitudinal cylindrical surface and the inclined cylindrical surface will actually be, as viewed in elevation, a slightly dipping arc, no attempt has been made in the drawings to indicate the slight variation introduced by such an arc dipping from horizontal. In said external longitudinal cylindrical upper portions of the jaws is a peripheral groove 41, and in this groove is an endless flat annulus 42 which is shown as an inturned rim at the bottom end of a hollow guide cylinder 43. Ample differential in depth of said groove 41 and inner circumference of said annulus or rim 42 is provided to accommodate radially outward movement of the jaws for the subsequently described ratcheting action of the threads of the jaws and stud. Likewise the head portions 44 of the jaws above groove 41 have a less radius than the radius of the jaw immediately below the groove to also accommodate spread of the head portions within the hollow of guide cylinder 43. The annulus or rim 42 is assembled on the jaws before the jaws are introduced into the receptacle. In the assembled device, though the annulus permits the jaws to move laterally with respect to each other, yet it fits in the groove at its flat faces and necessitates that both jaws shall move precisely simultaneously in a longitudinal or axial direction since said annulus is integral with guide cylinder 43. Attention may be here called to the fact that when the jaws are in their lowermost position, in the absence of the stud, the previously described longitudinal edge margins 36 thereof will engage each other, resulting in reduced pitch diameter of the threads, and that the groove 41 is so located that it will be even then, entirely above the top surface 31 of the lands 29 so that said annulus or rim 42 is also above said lands and will not interfere with full contraction of said jaws toward each other.

Overlying the upper ends of jaws 35 flatwise on the top of head portion 44 thereof and within guide cylinder 43 is a pressure-distributing washer 45 of sufficiently smaller diameter than the interior of said cylinder to avoid binding therein and yet substantially centralized by presence of the cylinder therearound. The washer hole is made larger than the major diameter of the stud, so that, should a long stud be used, full entry of the stud will not be stopped by the washer. A spiral cone spring 46 is located above and bears on said washer, and is also centralized by said cylinder 43, the largest convolution of said spring being toward the washer. Said spring is maintained under compression by bearing at its smaller upper end against the under side of a cap 47 thereover, said cap depending at the sides of said receptacle 26 to which it is suitably secured as by swaging a peripheral bead 48 into a prepared annular recess 49 in the outer surface of the receptacle. The cap 47 not only applies the compression to the spring 46, but also protects the several mechanisms from injury or from extraneous interference to the intended functioning thereof. Said cap 47 performs the additional and important function of guiding the guide cylinder 43, and for accomplishment of that purpose the guide cylinder 43 has sliding fit within the cap. It will consequently now be appreciated that since the guide cylinder is kept axially aligned with the receptacle by virtue of its sliding fit in the cap, it cannot tilt, and since the cylinder rim or annulus 42 fits in nut groove 41, the jaws are likewise kept from tilting in any direction. It must also be remembered that the guide cylinder, inclusive of said annulus also performs the important function of obtaining precise synchronization of longitudinal movement of the jaws 35 in the receptacle.

While it has been stated above that the jaws 35 are screw threaded at 39 to cooperate and constitute a nut adapted to be screwed on and off of the threads 40 of stud 24, the invention also contemplates a construction by which the stud may be slid inwardly of the jaws across the threads of the jaws approximately to its inward position of use without having to rotate the stud, and when it reaches that position it may then be rotated and pulled tight by screw operation. In other words, the jaws 35 are constructed and arranged to function as a ratchet engagement for the initial range of insertion of the stud, and function as a threaded nut for bringing separated panels together and for performing the final clamping operation. This accordingly supplies the desired quick fastening feature of the invention. In this connection, it is now appropriate to point out, as shown in FIG. 7, that the threads 39 of each jaw are crescent-shaped, the major diameter having a radius C and the minor diameter having a radius D. Said radii C and D are equal to each other, and not less than the radius of the major diameter of the stud threads 40, but the centers of radii C and D are off-set or eccentric to each other in appropriate direction for obtaining the resultant crescent shape of the threads. Provision of threads of this shape for the jaws provides an arcuate contour for the inwardly directed crests or ridges of the threads which will conform to the like contour of the major diameter crests of threads 40 of the stud and thus avoid damage to the stud threads by the sliding thereof across the threads 39 of the jaws since the minor diameter crests of the jaw threads will have the same curvature as the engaged major diameter crests of the stud threads and consequently there will be no projecting corners or interference at the ends of the jaw threads at edge margins 36 that can dig into the stud threads, and will therefore allow the stud to slide inwardly without difficulty. It may be here emphasized that the jaw threads 39 have maximum depth from crest to valley medially between the ends appearing at edge margins 36, and that from said edge margins the threads become progressively deeper to their maximum depth midway between said edge margins and where they are at maximum distance from the dividing plane of the nut. The maximum depth of the crescent threads 39 thus provided in the jaws 35 is here shown equal to the depth of the stud threads 40 which mesh therewith in use.

Of course when the stud 24 is in threaded engagement wiht the jaws 35, the center for the major diameter of radius C of the jaw threads 39 will be coincident with the stud axis. Before entry of the stud, the opening for its reception formed by the concave threaded surfaces of the jaws, is in the nature of an ellipse since the plane of abutting longitudinal edge margins 36, namely, the nut-dividing plane, is at a less distance from the crest of the jaw thread, measured on a radius thereto perpendicular to that plane, than the length of that radius to the center for the thread curvature. In other words, the said plane is inward toward the threads from the center of curvature for the threads and further inward from the center for radius D than for radius C, and is, therefore, slightly chordal rather than truly diametric. The effect of this construction is provision of a constricted pitch diameter for the jaws less than the pitch diameter of the stud threads while the jaws await introduction of the stud. Consequently, upon initial introduction of the stud, the jaws will be immediately spread and by virtue of pressure from spring 46, will generate prevailing torque against the stud threads when the jaw threads and stud threads are in seated engagement for all positions of insertion of the stud between the jaws. Under these recited conditions of thread engagement with prevailing torque, the pitch diameter of the threads of the jaws then is identical with the pitch diameter of the threads of the stud.

The threads 39 of the jaws 35 and threads 40 of the stud 24 are specally shaped as to angular dispositon of the facets thereof to the axis. For identification purposes, one facet of each thread will be referred to as the insertion facet 50 and includes a primary portion having a relatively long inward upward taper toward the axis, permitting sliding insertion of the stud into the jaws, whereas the other facet, for convenience designated the retention facet 51, is within a critical range of 90° to 120° to the axis so as to prevent retraction of the stud except by unscrewing actuation thereof. Otherwise defined, the primary portion of the insertion facets have materially greater length from crest to valley than the retention facets, and the primary portion of each insertion facet has a closer approach to parallelism to the axis than to a perpendicular to the axis, whereas the retention facet has short length from crest to valley and is perpendicular to or more nearly perpendicular to the axis than the insertion facet. The arbitrary angularities selected for illustration in the drawings, show the retention facets at substantially the preferred angle of 90° to the axis, and show the primary portions of the insertion facets as having an acute angle of 45° to the axis within the critical range of 45° to 60° to the axis. It should be clearly understood that the description just given of the threads including insertion facets and retention facets at the stated angular dispositions applies both to the jaw threads and to the stud threads, and to save repetition of the description later, it may here be stated that the same also applies to the threads of the modified constructions of FIGURES 10 to 12. Likewise as to all showings of the threads, it is preferable to flatten the ridges or crests, as indicated at 52, these being considered secondary portions of the insertion facets, so as to avoid an acute angle and sharp edges at the junction of the insertion facet and retention facet. Furthermore, it is preferable to employ multiple threads for accelerating operation when screw action is employed.

Directing attention now to other characteristics of the stud construction, it will be noted that the end of the stud shank remotely opposite from the stud head 25, has a coaxial rivet 53 integral with the shank and adapted to be located in a flaring hole of a terminal washer 54 and there peened into holding engagement with the washer. The stud shank has at least one longitudinal groove 55 (two being shown in FIG. 3) extending from the stud head 25 to said terminal washer 54, said washer lapping over the end of the groove. After the stud and terminal washer are assembled (or before such assembly if desired) a split ring 56 is applied to the stud shank, said split ring having a radially inwardly directed lug 57 for each groove 55 of the stud, and adapted to slide, with the ring, from end to end of the stud shank but prevented from leaving the stud because of engagement of the lug with said terminal washer. The internal diameter of the split ring 56 is larger than the maximum daimeter of the stud threads 40 so the ring will not bind but may be freely slid as occasion requires and will not in the least interfere with sliding the stud into the receptacle and between the jaws. The ring 56 has an outside diameter larger than the hole 23 in outer member 21 and therefore will retain the stud associated with that member when the stud is entirely released from the receptacle, and since the ring can slide up to the terminal washer, the stud can be withdrawn for substantially its whole length from the member but without separation entirely therefrom. One of the members, for instance inner member 20, may have its hole countersunk, as at 58 to accommodate the ring between the members when assembled.

The construction above described enables clamping of members 20, 21 to be effected very readily in the following manner. The head 25 of the stud 24 is pressed in a direction axially of the stud and receptacle upon initial insertion of the threaded end of the stud into the open end of the receptacle, and will thereby cause the end thread of the stud to push against the most proximate of threads 39 of the jaws 35 in an endeavor to mesh therewith. Due to the pressure of spring 46 on the jaws sliding them to their lowermost position in the receptacle and due to the dividing plane of the jaws being slightly chordal rather than truely diametric, the threaded opening between the jaws is of a somewhat elliptical character, in consequence of which the pitch dameter of the jaw threads 39 is initially then in effect less than the pitch diameter of the stud threads 40, so the operation of pushing the stud 24 upwardly causes the jaws 35 to both move axially upwardly and radially outwardly under guiding direction of overlapping sliding engagement of the insertion facets 50 of the engaging end threads of the stud and jaws, that action being repeated successively with the other insertion facets as the stud is pressed further inwardly. The cone spring 46 tends to return the jaws downwardly and as said jaws are in sliding engagement with the inclined segmental cylindrical back walls or faces 32 of the channels 34 in which the jaws are mounted, the retention facets of the jaw threads will snap into engagement under the retention facets of the stud threads immediately upon registration therewith. This ratcheting action of the jaws is repeated for each registering thread convolution as the stud is progressively pushed inwardly.

It will be understood that at any stage of insertion of the stud 24 after engagement with the first thread of the jaws 35, that the stud may be screwed inwardly of the jaws if desired. Ordinarily, however, the stud will be pushed quickly to its appropriate innermost position and will then be rotated clockwise by a tool, such as a screw driver applied in a kerf 59 in the under face of a stud head 25, to tighten the stud in place. By so tightening the stud, the jaws are caused to forcefully engage at their back inclined segmental cylindrical faces 37 against the correspondingly inclined segmental cylindrical cavity faces 32 with full overlapping surface engagement, and apply that force distributed over the entire overlapping areas both with respect to axial and radial moments of force developed. These forces also apply against the extensive interengaging surfaces of the insertion facets of the stud and jaws which therefore also provide large areas to withstand the severe applied forces. These forces not only clamp the members 20, 21 tightly, but also lock the stud against backward or releasing rotation. The fact the inclined segmental cylindrical faces of the jaws and receptacle provide extensive full surface overlapping contact is an essential and most important feature in that it will uniformly distribute the most severe forces ever to be encountered by such a device over such a large area of the jaws and receptacle that injury heretofore due to concentration of forces in frusto-conical devices is totally avoided.

It will also be recognized that the action of spring 46 constantly pressing upon the jaws 35 in conjunction with the full overlapping surface engagement of the inclined segmental cylindrical faces of the jaws and cavity, will generate a prevailing torque of stud and jaw engagement at all locations of the stud within the jaws, and even if a stud is not screwed fully home, the prevailing torque will keep it from unintended unscrewing. To release the device from its clamping condition, the stud may be rotated anti-clockwise, as by use of a screw driver, and entirely retracted by fully unscrewing it from the jaws. The jaws automatically, by virtue of the spring pressure, return to their most contracted initial position ready for again receiving the stud. The stud, though free from the jaws, will remain assembled with the outer member 21 by retention thereof effected by split ring 56 being stopped at the inner end of the stud as the stud moves outwardly, by presence of retaining washer 54 thereat.

Considering now the modifications illustrated, FIGURE 10 shows a receptacle 60 which, as in the preceding construction, is a hollow body corresponding to the one already described, having a cavity with two lands with parallel inwardly facing surfaces forming channels having inclined segmental cylindrical back walls 32. In this instance, the peripheral side wall of the receptacle continues upwardly above the top plane 30 of the lands, as at 61, and a disc cap 62 is applied by swaging a top rim 63 of said peripheral wall over the edge margin of the cap. The receptacle 60 also is shown with a flange 27' with rivets 27 securing the same to a member 20 to be clamped, said member having a hole 22 coaxial with the receptacle in use and countersunk at its under side at 58 as previously described to receive the ring of FIG. 6 on a stud similar to that shown in FIG. 4, all of which will be understood by reference to the description of those elements heretofore given.

Cooperating jaws 64 are provided in the receptacle 60 conforming in all respects to the jaws previously described except as to the means for retaining them in axial registration. In this instance, the peripheral groove and guiding cylinder are not shown, but instead, said jaws have interfitting engagement proximate to the edge margins thereof. In this showing, one jaw has a tenon 66 projecting in a circumferential direction at the edge margin, and the other jaw has a mortise 67 for receiving said tenon. This arrangement permits the jaws to expand radially, but prevents longitudinal displacement of one to the other and therefore will keep the threads 39 properly aligned. As with the previously described jaws, the rear faces are inclined segmental cylinders 37 which have full surface contacting engagement with the inclined segmental cylindrical back walls 32 of the receptacle cavity channels. A pressure distributing washer 45 with a spiral cone spring 46 seated thereon is located as before at the top of the jaws, said spring being under compression by engagement at its upper end against disc cap 62. Operation accords with that given in connection with FIGS. 1 to 9.

Instead of a mortise and tenon as above described as means for keeping the jaws in axial registration, the flat faces 68 of jaws 69 shown in FIG. 12, which are otherwise identical with the jaws of FIGS. 10 and 11, may have keyways 70 thereacross. Flat keys 71 are located in said keyways flush with the said flat surfaces of the jaws, permitting the jaws to expand radially, but preventing longitudinal displacement with respect to each other.

The method of manufacture of the nut jaws and receptacle is preferably by an extrusion process, with utilization of powdered metal. For example, in carrying out such a process, electrolytic iron having a carbon content in the range of 0.10 to 0.20 is mixed with about one to one and a half percent zinc stearate or with a like amount of powdered wax, such as bees-wax, or other lubricant. This obtains a mass of sufficiently pasty constituency to be extruded by gravity or under pressure into a forming die of appropriate shape for the element being made. The forming pressure employed has to be of greater intensity per square inch for larger masses being formed, and so for the small mass employed for the jaws, a pressure of twenty thousand pounds per square inch up to perhaps thirty thousand pounds per square inch gives a sharply defined, homogeneous formation of jaw. The pressure employed in formation of the receptacle, in view of greater mass, is considerably higher than that for the jaws, and while eighty thousand pounds per square inch may be considered a maximum pressure, the use of sixty thousand pounds per square inch is an approximation of the average pressure needed for the ordinary size of receptacle. After the element has been shaped and compressed, it is baked for about a half hour at a temperature of about 2050° F., which is very close to the melting point of iron. The stearate, wax or other lubricant employed is evaporated at this temperature and the powdered iron coagulates, fuses or otherwise becomes a solid indivisible mass having the desired shape. For greater accuracy of the finished product, it may be re-coined or compressed at the termination of the baking thereof and thereby rectify any warping or other disfiguration that may have occurred during baking. As a final step, the otherwise completed jaws and receptacle are case carburized to desired depth and hardened to extent of 58–60 Rockwell C scale as desirable hardness.

The most important parts of the device hereabove described comprise the receptacle and jaws. For commercial applications, where great strength and high temperature are not primarily important factors, said parts may be made of an appropriate type of plastic, nylon and various thermosetting plastics being suitable for the purpose and adaptable to being die-cast or molded by conventional methods such as injection molding. It will be appreciated that a receptacle and jaws of the character shown and described are difficult and extremely expensive to fabricate from materials such as steel, and while, when so made, they have the desirable attributes of resistance to heat and of great strength, are, nevertheless, subject to ill effects of moisture, corrosion, oils, acids, oxidation and so forth. For illustrative purposes, FIG. 2 has been duplicated in the showing of FIG. 13 with usual cross-sectioning of the jaws and receptacle indicating their composition as a plastic, but as the device is otherwise identical with the description of FIG. 2, the same reference characters are applied without repetition of the description here deemed necessary. It may be added, however, that cap 47, which is of metal, fits tightly upon the cylindrical portion of receptacle 26 and slid home on the plastic with pressure to prevent any expansion of the plastic when internal pressure is applied thereto in use. Although the tensil strength of plastic is considerably lower than that of steel, yet by enclosing the cylindrical portion of the plastic receptacle in the steel cap, the plastic will only be subjected to compression since the tensil strain is fully taken care of by the cap resisting the radial forces developed by the wedging action of the jaws. The strength of the steel cap added to the inherent strength of the plastic of the receptacle, therefore provides a device having a strength sufficiently approaching that of the above-described steel receptacle to meet the ordinary requirements of devices of this character.

In addition to the advantages of lowered cost of manufacture and lightness in weight gained by utilization of plastic for the receptacle and jaws, a superiority is also acquired by virtue of the plastic not being affected by moisture, corrosion, oils, acids, oxidation, and so forth. Furthermore, I have discovered that the segmental cylindrical surfaces of the jaws and receptacle in their surface-to-surface contact under pressure, slide more readily than with those parts made of steel, and also the threads of the plastic jaws provides a most excellent bearing engagement with the steel threads of the stud. It is also permissible to utilize plastic material for a construction such as shown in FIG. 10, for the receptacle as well as for the jaws by virtue of the greater thickness of the receptacle wall made available therein. For assuring maximum strength, however, the use of a metal cap has its advantage.

I claim:

1. A fastening device of the quick-locking type, comprising a receptacle having an axial cavity therein one end whereof is smaller than the other end, a threaded stud insertable into said receptacle cavity on a common axis therewith, movable jaws in said receptacle cavity adapted to be moved into proximity one to the other, said jaws having concave faces providing crescent-shaped threads with partial convolutions in each said concave face and each said partial convolution less than semicircular, and the partial convolutions of threads of one jaw directed toward the partial convolutions of threads of the other jaw, and the said partial convolutions in position of closest proximity of the jaws forming an opening of elliptical character requiring forcible introduction of the stud thereinto by the stud sliding and spreading the jaws apart and then providing a circular opening by engagement of the major diameter peaks of the stud threads passing over the minor diameter peaks of the threads of the jaws, the radius of said minor diameter of the jaw threads and radius of the major diameter of the stud threads being equal to each other, and said jaws and receptacle having inter-engaging inclined segmental cylindrical surfaces of equal radius to each other, the segmental cylindrical surfaces of the jaws being at the opposite sides thereof from said concave faces and being juxtaposed against and overlapping respective ones of said segmental cylindrical surfaces of the receptacle in full surface contact therewith where overlapping, the axes of the segmental cylindrical surfaces of the jaws converging toward each other and each coaxial with the respective axis of the segmental cylindrical surface of the receptacle to which that jaw is juxtaposed and with the said segmental cylindrical surfaces converging toward said smaller end of the cavity, said jaws when in position of most proximate relation to each other having longitudinal end portions beyond the divergent ends of the segmental cylindrical surfaces of both the receptacle and jaws, said end portions together having a circumferential groove providing upper and lower walls in radial planes and having greater depth radially than the maximum radial depth of said crescent threads, and an annular rigid means of greater external diameter than the larger diameter of the jaws at the divergent ends of the segmental cylindrical surfaces of the receptacle so as to project radially therebeyond, said rigid means also projecting radially inwardly into said groove in partial engagement with said upper and lower walls thereof.

2. A fastening device of the quick-locking type in accordance with claim 1, wherein said coordinating means also comprises a longitudinally movable guide cylinder of greater radius than said jaws and is at the periphery of said jaws, said cylinder having an internal annulus, said jaws having a sliding fit with said annulus and movable in a direction radial to said annulus and having a portion projecting beyond said annulus into and encompassed by said cylinder, said cylinder having an internal radius greater than the radius of said portion of the jaws encompassed by said cylinder, and fixed means on the receptacle mating with said cylinder guiding said cylinder to slide longitudinally and restraining said cylinder from lateral displacement.

3. A fastening device of the quick-locking type, comprising a receptacle having a longitudinal cavity the upper end whereof is larger than the lower end, a stud insertable into said receptacle cavity from the smaller end thereof toward the larger end, movable jaws in said receptacle cavity, annular rigid means confining said jaws to a predetermined limited amount of radial movement, each of said jaws having a concave face directed radially inwardly of said cavity, each said jaw and the receptacle having contiguous inclined segmental cylindrical surfaces of equal radius to each other and axes longitudinally of said surfaces, the exterior of said jaws thereby each being radially larger at the upper portions thereof than at the lower portions so as to correspond to the larger upper end and smaller lower end of said cavity, and said jaws together having a circumferential groove at said larger portions above said larger upper end of said cavity, said groove providing upper and lower walls in radial planes and each of said walls having greater depth radially than said predetermined limited amount of radial movement of the jaws, said jaws having the inclined cylindrical segmental surfaces thereof juxtaposed slidably against and overlapping respective ones of said segmental cylindrical surfaces of the receptacle in full surface contact therewith where overlapping, said inclined segmental cylindrical surfaces of the jaws converging toward each other toward the smaller end of said cavity and each coaxial with the respective axis of the segmental cylindrical surface of the receptacle to which that jaw is juxtaposed, and said annular rigid means having greater external diameter than the larger diameter of the jaws beyond the upper ends of said segmental cylindrical surfaces of the receptacle so as to project radially outwardly therebeyond, said rigid means also projecting radially inwardly into said groove in partial engagement with said upper and lower walls thereof and maintaining the axes of said concave faces of the jaws in parallelism to each other and to said receptacle axis in all positions of the jaws sliding in the receptacle.

4. A fastening device of the quick-locking type in accordance with claim 3, wherein said jaws each have the upper extremities thereof beyond the said upper wall of the groove, said extremities together constituting a head portion, and said head portion having a less diameter than said larger diameter of the jaws, and wherein said rigid means projecting radially inwardly of said groove in part underlies said head portion and at its outer periphery has an upwardly open hollow cylindrical guide projecting longitudinally away from the receptacle and receiving said head portion therein, said guide having an inner diameter for said hollow greater than the diameter of said head portion to an amount at least as great as said predetermined limited amount of radial movement of both jaws.

5. A fastening device of the quick-locking type in accordance with claim 4, wherein said guide means comprises a cylinder integral with an annulus, the groove of said half sleeves riding on said annulus, and a cap for guiding said guide cylinder coaxial to said receptacle axis.

6. A fastening device of the quick-locking type, comprising a receptacle having a cavity with an upper end larger than its lower smaller end, a threaded stud insertable into said receptacle cavity on a common axis therewith, movable jaws in said receptacle cavity, said jaws having concave faces directed toward each other and providing less than semi-circular crescent shaped threads on said concave faces with the major and minor radii of said crescent shaped threads equal in length to each other and equal in length to the radius of the major diameter of the threads of the stud whereby the stud may be slid over the crescent shaped threads with the full length of the crests of the stud threads engaging the full lengths of the jaw threads as the stud threads pass thereover, and said jaws and receptacle having inwardly downwardly inclined segmental cylindrical surfaces of equal radius to each other, the segmental cylindrical surfaces of the jaws overlapping the segmental cylindrical surfaces of the receptacle and juxtaposed thereagainst in full surface contact therewith where overlapping, said jaws together providing a peripheral groove and said groove located at a distance from the bottom of said jaws greater than the distance from the smaller to larger ends of the inclined segmental cylindrical surfaces of the receptacle, whereby said groove is always at a level above the top of the receptacle, and means projecting both inwardly into said groove and outwardly therefrom over the said top of the receptacle for coordinating sliding movement of the jaws on said inclined surfaces and on said means and maintaining register on the threads of said jaws with respect to each other.

7. A fastening device of the quick-locking type, comprising a receptacle having an upwardly directed upper shoulder, a threaded stud insertable into said receptacle on a common axis therewith, movable jaws in said receptacle, each of said jaws having a concave inner face and a convex outer face, longitudinal edges of the jaws at the sides of said concave faces located so that the side edges of one jaw face corresponding side edges of the other jaw, said concave faces and facing longitudinal edges extending to the upper and lower ends of the jaws, said inner concave faces having crescent threads the partial convolutions whereof terminate at said side edges as arcs less than semicircular, said convex outer faces of the jaws extending to the lower end of the jaws and incline outwardly thereabove toward said upper end of the jaws but of less length than the inner concave surfaces and terminate with a cylindrical margin the radius whereof is the same length as the radius of said inclined convex outer faces of the jaws, said jaws having a groove common to both jaws above said cylindrical margin and above the said upwardly directed shoulder of said receptacle, said jaws having a head portion above said groove with the radius of said head portion less than the radius of said cylindrical margin, and means common to said jaws and in said groove for coordinating movement of the jaws, said means protruding beyond said cylindrical margin of said jaws and overlying said shoulder of the receptacle and functioning thereat to limit downward sliding of the jaws in the receptacle and said means and receptacle providing mating cylindrical surfaces guiding said means axially.

8. A fastening device of the quick-locking type, comprising a receptacle and stud insertable into said receptacle on a common axis therewith, movable jaws in said receptacle, said jaws constituting a nut and having a groove peripherally of said nut, the nut having a head above said groove and said head having less diameter than the maximum diameter of the nut immediately below said groove, a guiding cylinder receiving said head of the nut therein loosely in a radial direction only, and means for guiding said cylinder for axial movement, said cylinder having a bottom annulus projecting into said groove, said annulus having a lower face of greater diameter than its upper face so as to extend beyond the periphery of said maximum diameter of the nut, said upper face extending to the inner periphery of said cylinder and having greater diameter than said nut head and maintained in sliding contact with said nut head, thereby limiting said jaws to radial movement only with respect to said annulus and guiding cylinder.

References Cited in the file of this patent

UNITED STATES PATENTS

| | | |
|---|---|---|
| 209,486 | Luther | Oct. 29, 1878 |
| 681,817 | Smith | Sept. 3, 1901 |
| 1,081,239 | Lantz | Dec. 9, 1913 |
| 1,879,421 | Nalle | Sept. 27, 1932 |
| 2,048,298 | Searles | July 21, 1936 |
| 2,294,745 | Goetz | Sept. 1, 1942 |
| 2,300,228 | Kenney | Oct. 27, 1942 |
| 2,367,480 | Beswick | Jan. 16, 1945 |
| 2,531,596 | Allen | Nov. 28, 1950 |
| 2,699,589 | Redell | Jan. 18, 1955 |
| 2,726,101 | Peterson | Dec. 6, 1955 |
| 2,874,877 | Spencer | Feb. 24, 1959 |
| 2,949,143 | Shur | Aug. 16, 1960 |

FOREIGN PATENTS

| | | |
|---|---|---|
| 285,790 | Great Britain | Jan. 3, 1929 |
| 628,316 | Great Britain | Aug. 26, 1949 |

OTHER REFERENCES

Dupont Product Engineering Bulletin Published by Dupont (Wilmington, Del.) 1954.